(12) United States Patent
Bharadia et al.

(10) Patent No.: US 9,832,003 B2
(45) Date of Patent: Nov. 28, 2017

(54) SYSTEMS AND METHODS FOR SELF-INTERFERENCE CANCELLER TUNING

(71) Applicant: Kumu Networks, Inc., Sunnyvale, CA (US)

(72) Inventors: Dinesh Bharadia, Palo Alto, CA (US); Jung-Il Choi, Saratoga, CA (US); Mayank Jain, San Jose, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/608,163

(22) Filed: May 30, 2017

(65) Prior Publication Data
US 2017/0264420 A1    Sep. 14, 2017

Related U.S. Application Data

(63) Continuation of application No. 14/643,795, filed on Mar. 10, 2015, now Pat. No. 9,698,860, which is a
(Continued)

(51) Int. Cl.
*H04L 5/14*  (2006.01)
*H04B 1/525*  (2015.01)
*H04L 5/00*  (2006.01)

(52) U.S. Cl.
CPC .......... *H04L 5/1438* (2013.01); *H04B 1/525* (2013.01); *H04L 5/0007* (2013.01); *H04L 5/143* (2013.01); *H04L 5/1461* (2013.01)

(58) Field of Classification Search
CPC ....... H04B 1/525; H04L 5/0007; H04L 5/143; H04L 5/1438; H04L 5/1461
See application file for complete search history.

(56) References Cited

U.S. PATENT DOCUMENTS 3,922,617 A    11/1975  Denniston et al.
4,321,624 A    3/1982   Gibson et al.
(Continued)

FOREIGN PATENT DOCUMENTS

EP    0755141     10/1998
EP    1959625     8/2008
(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.
(Continued)

*Primary Examiner* — Nader Bolourchi
(74) *Attorney, Agent, or Firm* — Jeffrey Schox; Thomas Gwinn

(57) ABSTRACT

A system for self-interference canceller tuning includes a transmit coupler that creates a sampled analog transmit signal; an analog self-interference canceller that transforms the sampled analog transmit signal to an analog self-interference cancellation signal according to a set of tuning parameters, the set of tuning parameters comprising complex weights for a set of taps of the analog self-interference canceller; a tuning circuit that calculates the set of tuning parameters, and applies the set of tuning parameters to the analog self-interference canceller based on component calibration data of the analog self-interference canceller; and a receive coupler that combines the analog self-interference cancellation signal with the analog receive signal to reduce self-interference in the analog receive signal.

20 Claims, 14 Drawing Sheets

Related U.S. Application Data continuation-in-part of application No. 14/456,367, filed on Aug. 11, 2014, now Pat. No. 9,036,749.

(60) Provisional application No. 61/950,742, filed on Mar. 10, 2014, provisional application No. 61/864,459, filed on Aug. 9, 2013.

(56) References Cited

U.S. PATENT DOCUMENTS

| | | | |
|---|---|---|---|
| 4,952,193 A | 8/1990 | Talwar | |
| 5,212,827 A | 5/1993 | Meszko et al. | |
| 5,691,978 A | 11/1997 | Kenworthy | |
| 5,734,967 A | 3/1998 | Kotzin et al. | |
| 5,790,658 A | 8/1998 | Yip et al. | |
| 5,818,385 A | 10/1998 | Bartholomew | |
| 5,930,301 A | 7/1999 | Chester et al. | |
| 6,215,812 B1 | 4/2001 | Young et al. | |
| 6,240,150 B1 | 5/2001 | Darveau et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,580,771 B2 | 6/2003 | Kenney | |
| 6,639,551 B2 | 10/2003 | Li et al. | |
| 6,657,950 B1 | 12/2003 | Jones, IV et al. | |
| 6,686,879 B2 | 2/2004 | Shattil | |
| 6,725,017 B2 | 4/2004 | Blount et al. | |
| 6,907,093 B2 | 6/2005 | Blount et al. | |
| 6,915,112 B1 | 7/2005 | Sutton et al. | |
| 6,965,657 B1 | 11/2005 | Rezvani et al. | |
| 6,985,705 B2 | 1/2006 | Shohara | |
| 7,057,472 B2 | 6/2006 | Fukamachi et al. | |
| 7,139,543 B2 | 11/2006 | Shah | |
| 7,177,341 B2 | 2/2007 | McCorkle | |
| 7,228,104 B2 | 6/2007 | Collins et al. | |
| 7,266,358 B2 | 9/2007 | Hillstrom | |
| 7,302,024 B2 | 11/2007 | Arambepola | |
| 7,336,128 B2 | 2/2008 | Suzuki et al. | |
| 7,336,940 B2 | 2/2008 | Smithson | |
| 7,348,844 B2 | 3/2008 | Jaenecke | |
| 7,349,505 B2 | 3/2008 | Blount et al. | |
| 7,362,257 B2 | 4/2008 | Bruzzone et al. | |
| 7,372,420 B1 | 5/2008 | Osterhues et al. | |
| 7,397,843 B2 | 7/2008 | Grant et al. | |
| 7,426,242 B2 | 9/2008 | Thesling | |
| 7,508,898 B2 | 3/2009 | Cyr et al. | |
| 7,509,100 B2 | 3/2009 | Toncich | |
| 7,706,755 B2 | 4/2010 | Muhammad et al. | |
| 7,733,813 B2 | 6/2010 | Shin et al. | |
| 7,773,759 B2 | 8/2010 | Alves et al. | |
| 7,773,950 B2 | 8/2010 | Wang et al. | |
| 7,778,611 B2 | 8/2010 | Asai et al. | |
| 7,869,527 B2 | 1/2011 | Vetter et al. | |
| 7,948,878 B2 | 5/2011 | Briscoe et al. | |
| 7,962,170 B2 | 6/2011 | Axness et al. | |
| 7,987,363 B2 | 7/2011 | Chauncey et al. | |
| 7,999,715 B2 | 8/2011 | Yamaki et al. | |
| 8,005,235 B2 | 8/2011 | Rebandt, II et al. | |
| 8,023,438 B2 | 9/2011 | Kangasmaa et al. | |
| 8,027,642 B2 | 9/2011 | Proctor, Jr. et al. | |
| 8,031,744 B2 | 10/2011 | Radunovic et al. | |
| 8,032,183 B2 | 10/2011 | Rudrapatna | |
| 8,055,235 B1 | 11/2011 | Gupta et al. | |
| 8,060,803 B2 | 11/2011 | Kim | |
| 8,081,695 B2 | 12/2011 | Chrabieh et al. | |
| 8,085,831 B2 | 12/2011 | Teague | |
| 8,086,191 B2 | 12/2011 | Fukuda et al. | |
| 8,090,320 B2 | 1/2012 | Dent et al. | |
| 8,155,046 B2 | 4/2012 | Jung et al. | |
| 8,155,595 B2 | 4/2012 | Sahin et al. | |
| 8,160,176 B2 | 4/2012 | Dent et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,270,456 B2 | 9/2012 | Leach et al. | |
| 8,274,342 B2 | 9/2012 | Tsutsumi et al. | |
| 8,306,480 B2 | 11/2012 | Muhammad et al. | |
| 8,331,477 B2 | 12/2012 | Huang et al. | |
| 8,349,933 B2 | 1/2013 | Bhandari et al. | |
| 8,351,533 B2 | 1/2013 | Shrivastava et al. | |
| 8,385,855 B2 | 2/2013 | Lorg et al. | |
| 8,385,871 B2 | 2/2013 | Wyville | |
| 8,391,878 B2 | 3/2013 | Tenny | |
| 8,417,750 B2 | 4/2013 | Yan et al. | |
| 8,422,540 B1 | 4/2013 | Negus et al. | |
| 8,428,542 B2 | 4/2013 | Bornazyan | |
| 8,446,892 B2 | 5/2013 | Ji et al. | |
| 8,457,549 B2 | 6/2013 | Weng et al. | |
| 8,462,697 B2 | 6/2013 | Park et al. | |
| 8,467,757 B2 | 6/2013 | Ahn | |
| 8,498,585 B2 | 7/2013 | Vandenameele | |
| 8,502,924 B2 | 8/2013 | Liou et al. | |
| 8,509,129 B2 | 8/2013 | Deb et al. | |
| 8,521,090 B2 | 8/2013 | Kim et al. | |
| 8,576,752 B2 | 11/2013 | Sarca | |
| 8,611,401 B2 | 12/2013 | Lakkis | |
| 8,619,916 B2 | 12/2013 | Jong | |
| 8,625,686 B2 | 1/2014 | Li et al. | |
| 8,626,090 B2 | 1/2014 | Dalipi | |
| 8,649,417 B2 | 2/2014 | Baldemair et al. | |
| 8,711,943 B2 | 4/2014 | Rossato et al. | |
| 8,744,377 B2 | 6/2014 | Rimini et al. | |
| 8,750,786 B2 | 6/2014 | Larsson et al. | |
| 8,755,756 B1 | 6/2014 | Zhang et al. | |
| 8,767,869 B2 | 7/2014 | Rimini et al. | |
| 8,787,907 B2 | 7/2014 | Jain et al. | |
| 8,798,177 B2 | 8/2014 | Park et al. | |
| 8,804,975 B2 | 8/2014 | Harris et al. | |
| 8,837,332 B2 | 9/2014 | Khojastepour et al. | |
| 8,842,584 B2 | 9/2014 | Jana et al. | |
| 8,879,433 B2 | 11/2014 | Khojastepour et al. | |
| 8,879,811 B2 | 11/2014 | Liu et al. | |
| 8,913,528 B2 | 12/2014 | Cheng et al. | |
| 8,929,550 B2 | 1/2015 | Shattil et al. | |
| 8,995,410 B2 | 3/2015 | Bala et al. | |
| 9,014,069 B2 | 4/2015 | Patil et al. | |
| 9,019,849 B2 | 4/2015 | Hui et al. | |
| 9,031,567 B2 | 5/2015 | Haub | |
| 9,042,838 B2 | 5/2015 | Braithwaite | |
| 9,054,795 B2 | 6/2015 | Choi et al. | |
| 9,065,519 B2 | 6/2015 | Cyzs et al. | |
| 9,077,421 B1 | 7/2015 | Mehlman et al. | |
| 9,112,476 B2 | 8/2015 | Basaran et al. | |
| 9,124,475 B2 | 9/2015 | Li et al. | |
| 9,130,747 B2 | 9/2015 | Zinser et al. | |
| 9,136,883 B1 | 9/2015 | Moher et al. | |
| 9,160,430 B2 | 10/2015 | Maltsev et al. | |
| 9,184,902 B2 | 11/2015 | Khojastepour et al. | |
| 9,185,711 B2 | 11/2015 | Lin et al. | |
| 9,231,647 B2 | 1/2016 | Polydoros et al. | |
| 9,231,712 B2 | 1/2016 | Hahn et al. | |
| 9,236,996 B2 | 1/2016 | Khandani | |
| 9,264,024 B2 | 2/2016 | Shin et al. | |
| 9,312,895 B1 | 4/2016 | Gupta et al. | |
| 9,325,432 B2 | 4/2016 | Hong et al. | |
| 9,331,737 B2 | 5/2016 | Hong et al. | |
| 9,413,500 B2 | 8/2016 | Chincholi et al. | |
| 9,413,516 B2 | 8/2016 | Khandani | |
| 9,461,698 B2 | 10/2016 | Moffatt et al. | |
| 9,490,963 B2 | 11/2016 | Choi et al. | |
| 9,537,543 B2 | 1/2017 | Choi | |
| 9,698,860 B2 | 7/2017 | Bharadia et al. | |
| 9,698,861 B2 | 7/2017 | Braithwaite | |
| 9,713,010 B2 | 7/2017 | Khandani | |
| 2002/0154717 A1 | 10/2002 | Shima et al. | |
| 2004/0106381 A1 | 6/2004 | Tiller | |
| 2005/0250466 A1 | 11/2005 | Varma et al. | |
| 2006/0058022 A1 | 3/2006 | Webster et al. | |
| 2007/0207747 A1 | 9/2007 | Johnson et al. | |
| 2007/0249314 A1 | 10/2007 | Sanders et al. | |
| 2008/0107046 A1* | 5/2008 | Kangasmaa | H04B 1/12 370/278 |
| 2008/0131133 A1 | 6/2008 | Blunt et al. | |
| 2008/0219377 A1 | 9/2008 | Nisbet | |

(56) References Cited

U.S. PATENT DOCUMENTS

| | | |
|---|---|---|
| 2010/0103900 A1 | 4/2010 | Yeh et al. |
| 2010/0136900 A1 | 6/2010 | Seki |
| 2010/0215124 A1 | 8/2010 | Zeong et al. |
| 2010/0226448 A1 | 9/2010 | Dent |
| 2011/0013684 A1 | 1/2011 | Semenov et al. |
| 2011/0026509 A1 | 2/2011 | Tanaka |
| 2011/0256857 A1 | 10/2011 | Chen et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0166259 A1 | 6/2013 | Weber et al. |
| 2013/0253917 A1 | 9/2013 | Schildbach |
| 2014/0011461 A1 | 1/2014 | Bakalski et al. |
| 2014/0169236 A1 | 6/2014 | Choi et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2015/0139122 A1 | 5/2015 | Rimini et al. |
| 2015/0215937 A1 | 7/2015 | Khandani |
| 2016/0218769 A1 | 7/2016 | Chang et al. |

FOREIGN PATENT DOCUMENTS

| | | |
|---|---|---|
| EP | 2237434 | 10/2010 |
| EP | 2267946 | 3/2014 |
| RU | 2256985 | 6/2000 |
| WO | 173250 | 11/2013 |
| WO | 185106 | 12/2013 |
| WO | 093916 | 6/2014 |

OTHER PUBLICATIONS

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

\* cited by examiner

SYSTEMS AND METHODS FOR SELF-INTERFERENCE CANCELLER TUNING

CROSS-REFERENCE TO RELATED APPLICATIONS

This application is a continuation of U.S. patent application Ser. No. 14/643,795, filed 10 Mar. 2015, which claims the benefit of U.S. Provisional Application Ser. No. 61/950,742, filed on 10 Mar. 2014, and is a continuation-in-part of U.S. patent application Ser. No. 14/456,367, filed on 11 Aug. 2014, which claims priority to U.S. Provisional Application Ser. No. 61/864,459, filed on 9 Aug. 2013, all of which are incorporated in their entireties by this reference.

TECHNICAL FIELD

This invention relates generally to the wireless communications field, and more specifically to new and useful systems and methods for self-interference canceller tuning.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference are non-ideal; specifically, many self-interference solutions are not easily or effectively adjusted to maintain a consistently high level of self-interference cancellation. Thus, there is a need in the wireless communications field to create new and useful systems and methods for self-interference canceller tuning. This invention provides such new and useful systems and methods.

DESCRIPTION OF THE PREFERRED EMBODIMENTS

Figure 1:
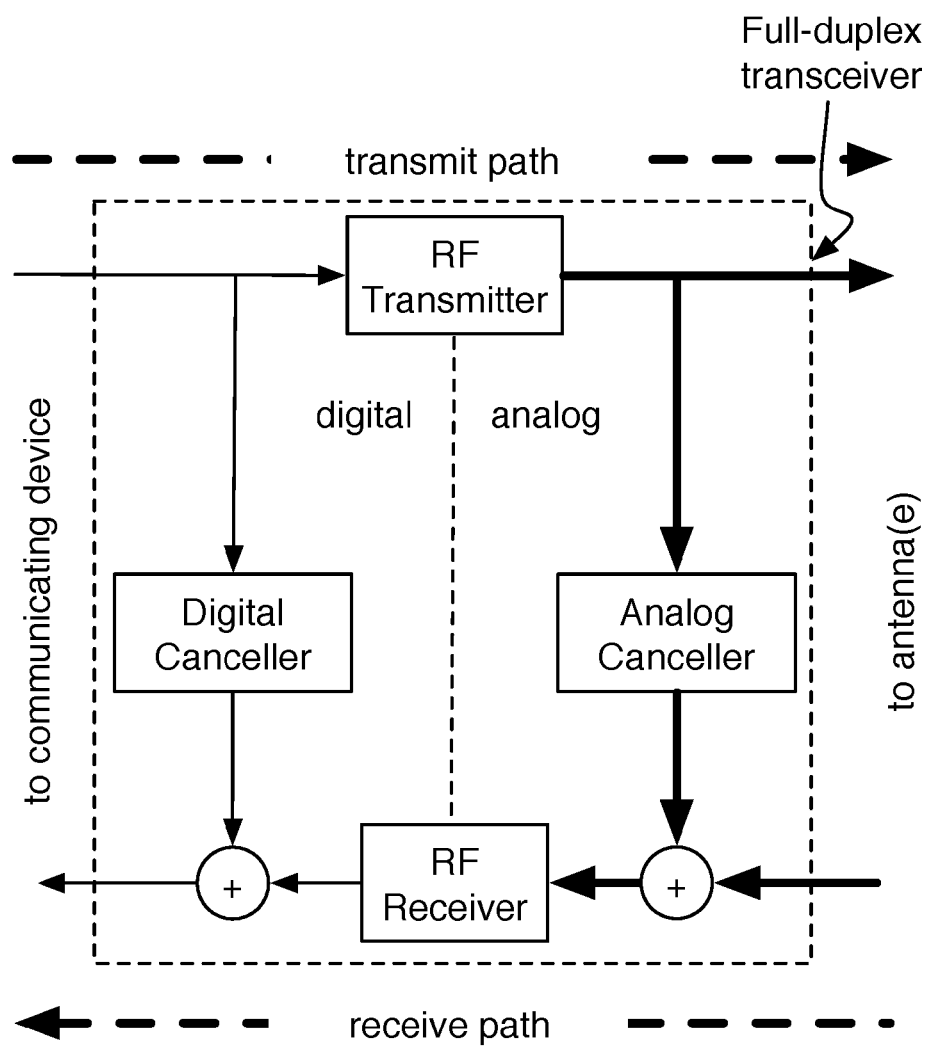
FIG. 1 is a schematic representation of a full-duplex transceiver.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog cancellation system removes a first portion of self-interference by summing delayed and scaled versions of the RF transmit signal to create an RF self-interference signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

This architecture is generally effective for reducing interference, but the architecture may be limited in effectiveness by the architecture's ability to adapt to both changing self-interference characteristics as well as changing cancellation circuit properties (e.g., component drift, temperature change, etc.).

The systems and methods described herein increase the performance of full-duplex transceivers as shown in FIG. 1 (and other applicable systems) by enabling dynamic tuning of self-interference cancellers, thus allowing for increased effectiveness in self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Self-Interference Canceller Tuning

Figure 2:
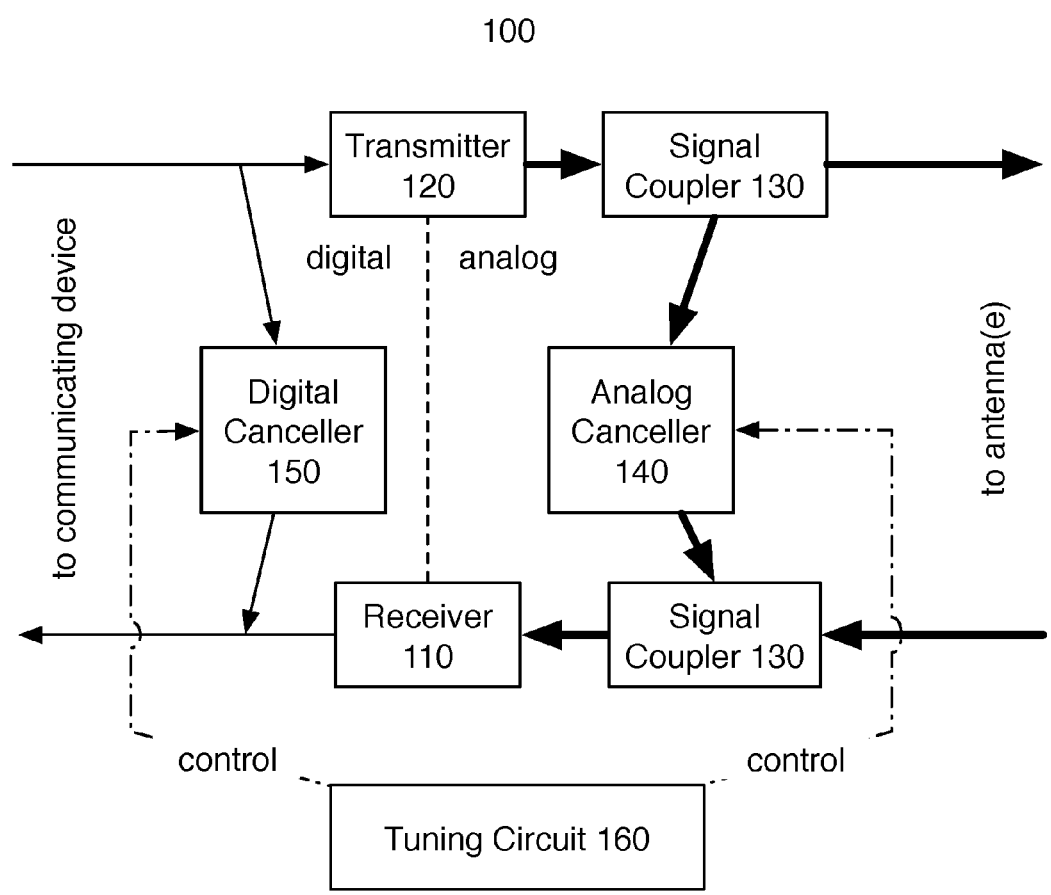
FIG. 2 is a schematic representation of a system of a preferred embodiment.

As shown in FIG. 2, a system 100 for self-interference canceller tuning includes a receiver 110, a transmitter 120, a signal coupler 130, an analog self-interference canceller 140, a digital self-interference canceller 150, and a tuning circuit 160. The system may additionally or alternatively include any subset of these components.

The system 100 functions to increase the performance of full-duplex transceivers (or other applicable systems) by performing self-interference canceller tuning. The tuning circuit 160 preferably controls parameters of the analog self-interference canceller 140 and/or the digital self-interference canceller 150 to maintain or increase self-interference cancellation performance over time.

The system 100 may perform self-interference cancellation by performing analog and/or digital self-interference cancellation based on any number of sampled analog and/or digital transmit signals. For example, the digital self-interference canceller 160 may sample a digital transmit signal, as shown in FIG. 2, but the digital self-interference canceller 160 may additionally or alternatively sample an analog transmit signal (e.g., through an ADC coupled to the analog transmit signal).

The system 100 preferably performs analog and digital self-interference cancellation simultaneously and in parallel, but may additionally or alternatively perform analog and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver no preferably converts analog receive signals into digital receive signals for processing by a communications system, but may additionally or alternatively not convert analog receive signals (passing them through directly without conversion).

The receiver no is preferably a radio-frequency (RF) receiver, but may additionally or alternatively be any suitable receiver.

The receiver no is preferably coupled to the communications link by a duplexer-coupled RF antenna, but may additionally or alternatively be coupled to the communications link in any suitable manner. Some examples of alternative couplings include coupling via one or more dedicated receive antennas. In another alternative coupling, the receiver 110 may be coupled to the communications link by a circulator-coupled RF antenna.

Figure 3:
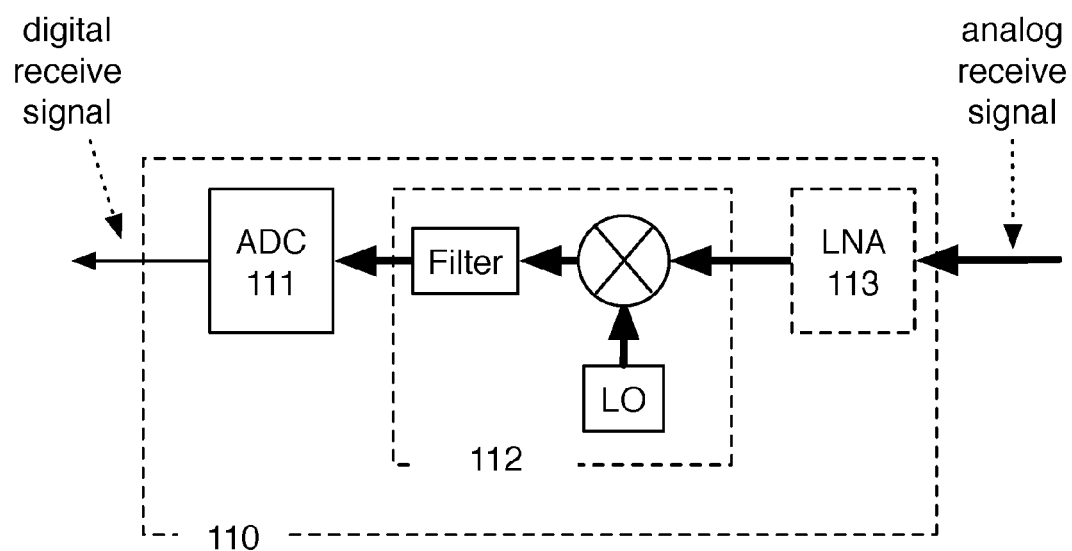
FIG. 3 is a schematic representation of a receiver of a system of a preferred embodiment.

The receiver 110 preferably includes an analog-to-digital converter (ADC) 111 and a frequency downconverter 112, as shown in FIG. 3. The receiver 110 may additionally include a low-noise amplifier 113. The receiver 110 may additionally or alternatively include amplifiers, filters, signal processors and/or any other suitable components. In one variation of a preferred embodiment, the receiver 110 includes only analog processing circuitry (e.g., amplifiers, filters, attenuators, delayers). The receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) 111 functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The transmitter 120 functions to transmit signals of the communications system over a communications link to a second communications system. The transmitter 120 preferably converts digital transmit signals into analog transmit signals.

The transmitter 120 is preferably a radio-frequency (RF) transmitter, but may additionally or alternatively be any suitable transmitter.

The transmitter 120 is preferably coupled to the communications link by a duplexer-coupled RF antenna, but may additionally or alternatively be coupled to the communications link in any suitable manner. Some examples of alternative couplings include coupling via one or more dedicated transmit antennas. In another alternative coupling, the transmitter 120 may be coupled to the communications link by a duplexer-coupled RF antenna.

Figure 4:
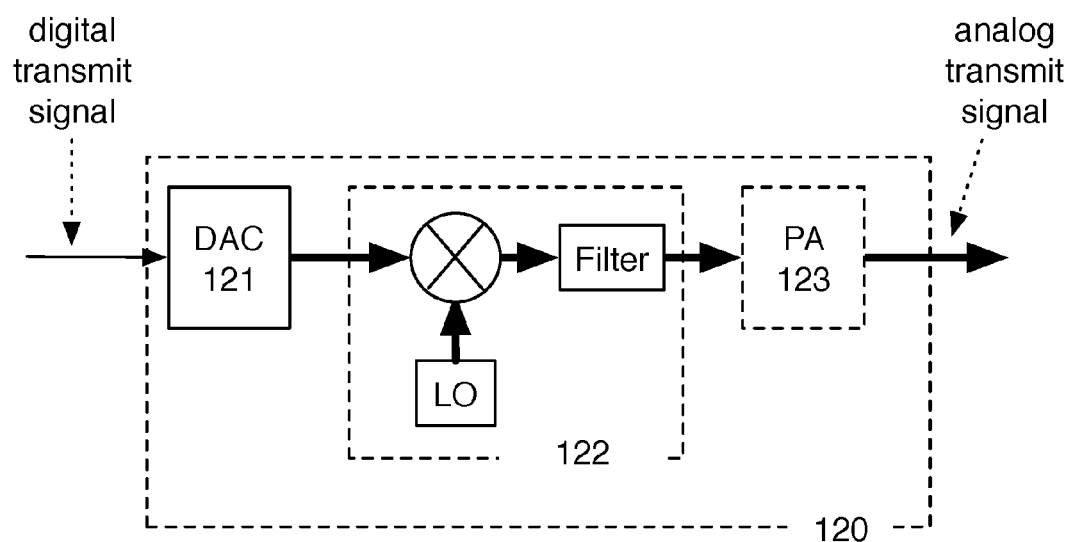
FIG. 4 is a schematic representation of a transmitter of a system of a preferred embodiment.

The transmitter 120 preferably includes a digital-to-analog converter (DAC) 121 and a frequency upconverter 122, as shown in FIG. 4. The transmitter 120 may additionally include a power amplifier 123. The transmitter 120 may additionally or alternatively include amplifiers, filters, signal processors and/or any other suitable components. The transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

Figure 5A:
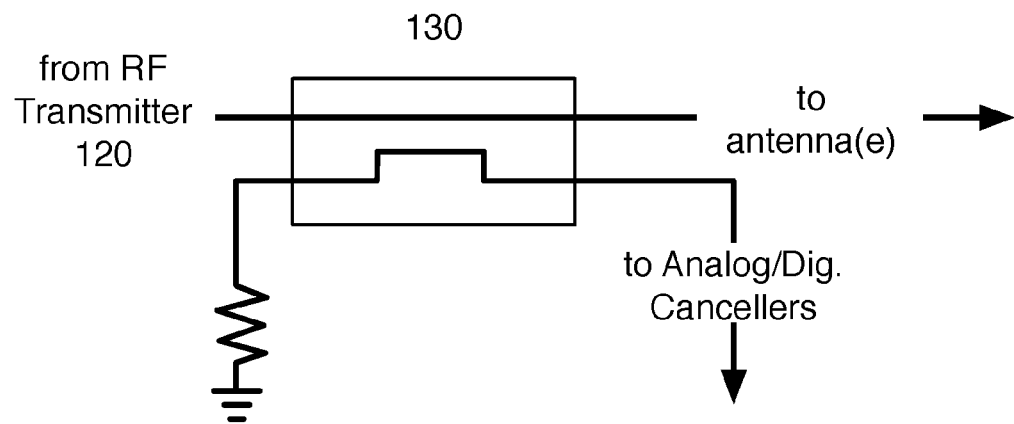
FIGS. 5A and 5B are schematic representations of signal couplers of a system of a preferred embodiment.
Figure 5B:
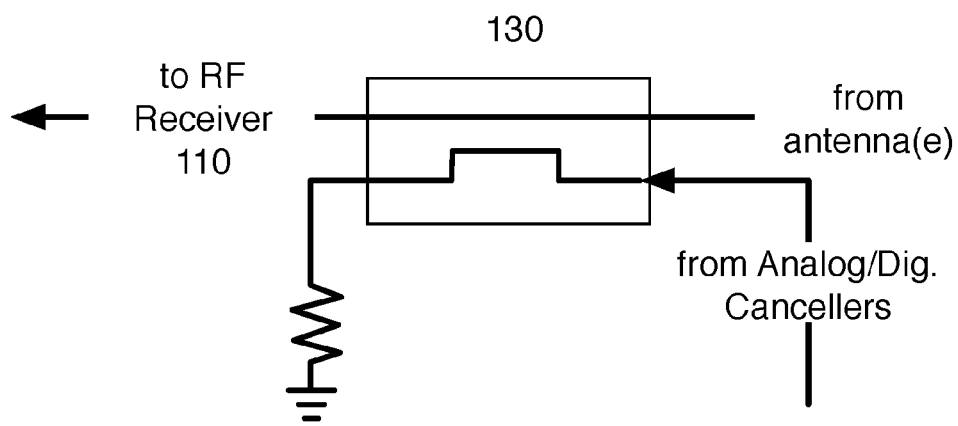

The signal coupler 130, as shown in FIGS. 5A and 5B, functions to allow signals to be split and/or joined. The signal coupler 130 may be used to provide a sample of the analog transmit signal for the analog canceller 140 and/or the digital canceller 160, as shown in FIG. 5A; that is, the signal coupler 130 may serve as a transmit coupler. The signal coupler 130 may also be used to combine one or more analog self-interference cancellation signals (from analog/digital cancellers) with the analog receive signal, as shown in FIG. 5B; that is, the signal coupler 130 may serve as a receive coupler. Additionally or alternatively, the signal coupler 130 may be used for any other purpose.

If the signal coupler 130 is used as a transmit coupler (which is assumed for the remainder of this paragraph), the signal coupler 130 is preferably directly coupled to the transmitter 120, but may additionally or alternatively be coupled indirectly to the transmitter 120 and/or be coupled to another suitable RF transmission source. The signal coupler 130 preferably has at least two outputs; one coupled to antenna(e) (directly or indirectly) and another coupled to one or more of the analog canceller 140 and the digital canceller 150. The signal coupler 130 preferably routes the majority of input power to the antenna(e) output port, but may additionally or alternatively route power in any suitable manner (e.g., routing the majority of power to other output ports). The signal coupler 130 may have any number of input and output ports, including bidirectional input/output ports.

If the signal coupler 130 is used as a receive coupler (which is assumed for the remainder of this paragraph), the receive coupler is preferably directly to the receiver no, but may additionally or alternatively be coupled indirectly to the receiver no and/or be coupled to another suitable RF receiver. The signal coupler 130 preferably has at least two inputs, one coupled to antenna(e) of the full-duplex radio (directly or indirectly) and another coupled to one or more of the analog canceller 140 and the digital canceller 150. The signal coupler 130 preferably couples the majority of power from both input ports to the receiver output port; this coupling preferably results in the receiver output port outputting a sum of one or more self-interference cancellation signals (generated by cancellers 140/150) and the RF receive signal (received at the antenna(e)). Additionally or alternatively, the signal coupler 130 may couple or route power in any suitable manner. The signal coupler 130 may have any number of input and output ports, including bidirectional input/output ports.

The signal coupler 130 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 130 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 130 are preferably phase-shifted by ninety degrees, but may additionally or alternatively be in phase or phase shifted by a different amount (e.g., zero degrees, 180 degrees).

The system 100 preferably includes two signal couplers 130 (a transmit and a receive coupler); these signal couplers 130 preferably connect to a single antenna through a duplexer or circulator, but may additionally or alternatively connect to multiple antennae. In one example, the transmit coupler and receive coupler connect to two separate antennae (e.g., a transmit antenna and a receive antenna); in another example, the transmit coupler and receive coupler both connect to the same two antennae. The transmit coupler and receive coupler may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 130 and antennae.

Figure 6:
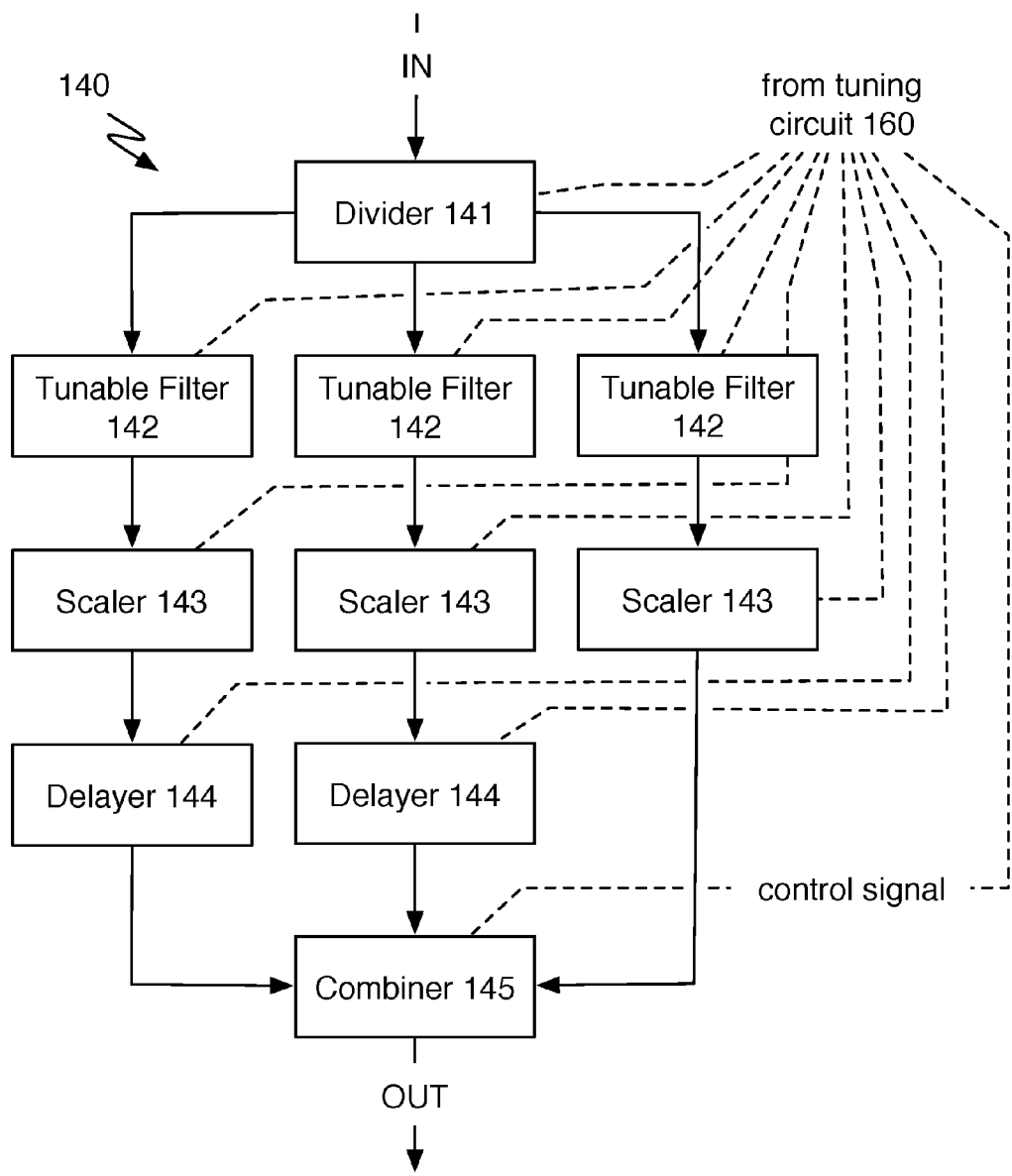
FIG. 6 is a schematic representation of an analog self-interference canceller of a system of a preferred embodiment.

The analog self-interference canceller 140, as shown in FIG. 6, functions to produce an analog self-interference cancellation signal from the analog transmit signal that can be combined with the analog receive signal to reduce self-interference present in the analog receive signal. The analog self-interference canceller 140 is preferably designed to operate at a single radio frequency (RF) band, but may additionally or alternatively be designed to operate at multiple RF bands, at one or multiple intermediate frequency (IF) bands, or at any suitable frequency band.

The analog self-interference canceller 140 is preferably implemented as an analog circuit that transforms an RF transmit signal into an analog self-interference cancellation signal by combining a set of filtered, scaled, and/or delayed versions of the RF transmit signal, but may additionally or alternatively be implemented as any suitable circuit. For instance, the analog self-interference canceller 140 may perform a transformation involving only a single version or copy of the RF transmit signal. The transformed signal (the analog self-interference cancellation signal) preferably represents at least a part of the self-interference component received at the receiver 110.

The analog self-interference canceller 140 is preferably adaptable to changing self-interference parameters in addition to changes in the analog transmit signal; for example, RF transceiver temperature, ambient temperature, antenna configuration, humidity, and RF transmitter power. Adaptation of the analog self-interference canceller 140 is preferably performed by the tuning circuit 160, but may additionally or alternatively be performed by a control circuit or other control mechanism included in the canceller 140 or any other suitable controller.

Figure 7:
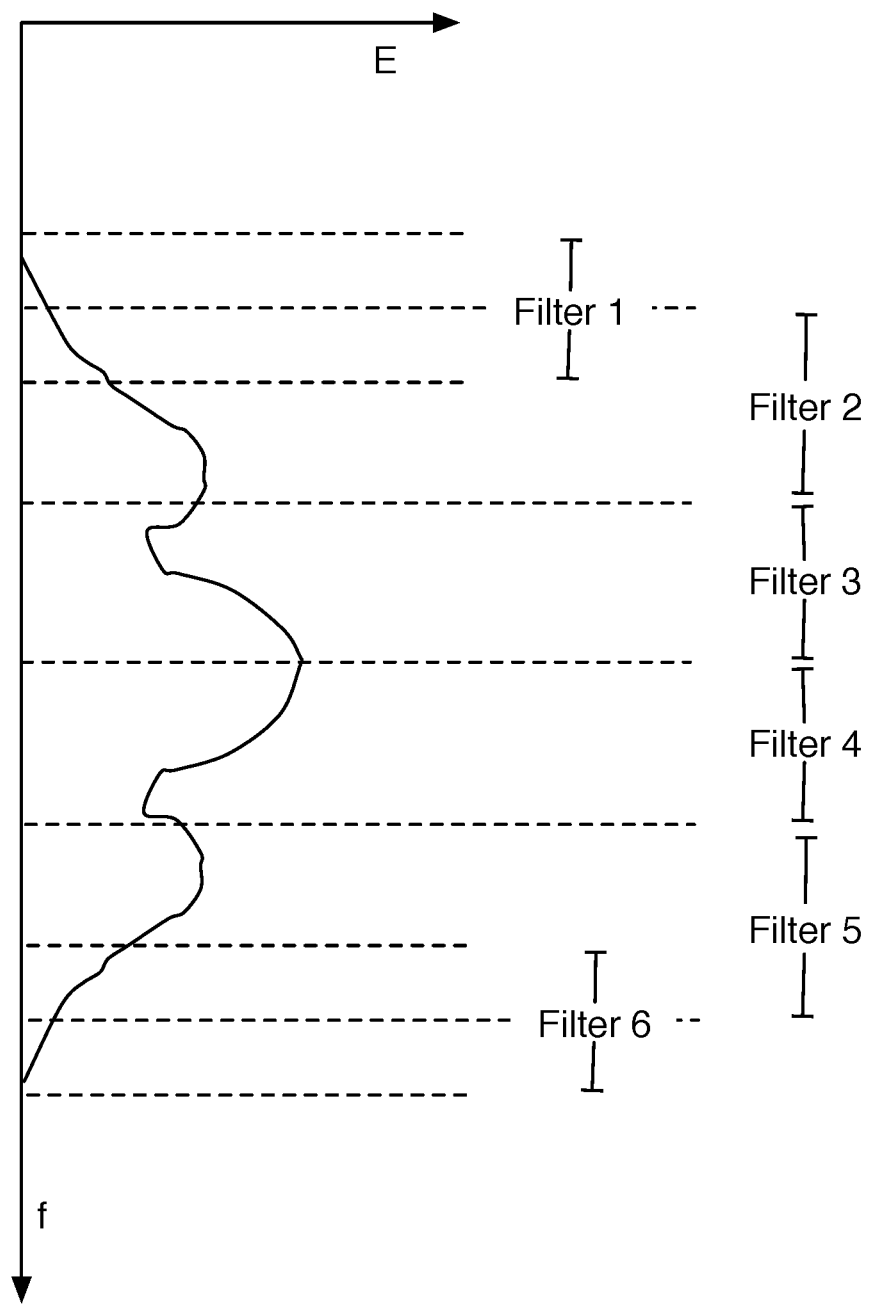
FIG. 7 is a frequency spectrum view of signal frequency sub-bands.

In one implementation of the preferred embodiment, the analog self-interference canceller 140 includes a signal divider 141, tunable filters 142, scalers 143, delayers 144, and a signal combiner 145, as shown in FIG. 6. In this implementation, the analog self-interference canceller 140 splits the transmit signal into sub-bands using the tunable filters 142, as shown in FIG. 7, and transforms each of these sub-bands individually before recombining them at the signal combiner 145. Note that the frequency sub-bands may overlap in frequency; there may additionally or alternatively be multiple filters 142 corresponding to the same frequency sub-band. Additionally or alternatively, some tunable filters 142 may pass the entire transmit band (e.g., the RF band or an IF band). The analog self-interference canceller 140 preferably transforms each sub-band by scaling (with the scaler 143) and delaying (with the delayer 144) signal components of each sub-band. In one implementation of the analog self-interference controller 140, the tunable filter 142 output is coupled to the scaler 143 input and the scaler 143 output is coupled to the delayer 144 input. In a second implementation, the tunable filter 142 output is coupled to the delayer 144 input, and the delayer 144 output is coupled to the scaler 143 input. The components of the analog self-interference controller 140 may be coupled in any manner that enables analog self-interference cancellation for the system 100. In one implementation of the analog self-interference controller 140, each signal path (i.e., each path associated with a different tunable filter 142) includes both a scaler 143 and a delayer 144; in an alternate implementation, signal paths may include only one of a scaler 143 and a delayer 144 or neither.

Separating the transmit signal into sub-bands enables the analog self-interference canceller 140 to generate an effective self-interference cancellation signal even when self-interference is highly variable with frequency; for instance, in situations where the full-duplex radio has an antenna configuration not optimized for its RF frequency, where the full-duplex radio is placed in a very strong multipath environment, and/or where the receiver 110 exhibits a substantially frequency-dependent response to RF signal input.

The signal divider 141 functions to split the transmit signal into multiple transmit signal paths, each directed to a tunable filter 142. The signal divider 141 preferably splits the transmit signal into multiple transmit signals having substantially the same waveform as the input transmit signal and equal power; the signal divider 141 may additionally or alternatively split the transmit signal into multiple transmit signals having different power levels and/or containing different waveforms than the input transmit signal. The signal divider 141 is preferably a transmission line power divider, but may additionally or alternatively be any suitable power divider, splitter, or coupler. The signal divider 141 may additionally contain any suitable electronics for pre-processing the transmit signal; for example, the signal divider 141 may contain an amplifier to increase the power contained in one or more of the output transmit signals.

Each tunable filter 142 functions to isolate transmit signal components contained within a frequency band (typically, but not always, a sub-band of the IF or RF transmit signal band) so that the component of self-interference resulting from the part of the transmit signal in that frequency band may be generated independently of the components of self-interference resulting from other parts of the transmit signal. As previously discussed, isolating transmit signal components by frequency sub-band allows for transformations to be performed on each signal component individually, increasing self-interference cancellation performance in situations where self-interference is substantially frequency dependent.

The tunable filters 142 are preferably multi-peak bandpass filters centered around a tunable intermediate frequency or radio frequency. Additionally or alternatively, the tunable filters 142 may be any other suitable type of filter. In a variation of a preferred embodiment, non-tunable filters may be substituted for tunable filters 142.

The tunable filters 142 are preferably passive filters, but may additionally or alternatively be active filters. The tunable filters 142 are preferably implemented with analog circuit components, but may additionally or alternatively be digitally implemented. The center frequency of each tunable filter 142 is preferably controlled by the tuning circuit 160, but may additionally or alternatively be controlled by any suitable system (including manually controlled, e.g. as in a mechanically tuned capacitor).

The tunable filters 142 preferably form a basis set for a desired or predicted transformation function; that is, the spectral properties of tunable filters 142 are preferably configured such that the number of signal paths required to produce a self-interference cancellation signal from a given analog transmit signal is reduced compared to a combination of simple (e.g., single peak) bandpass filters.

Figure 8:
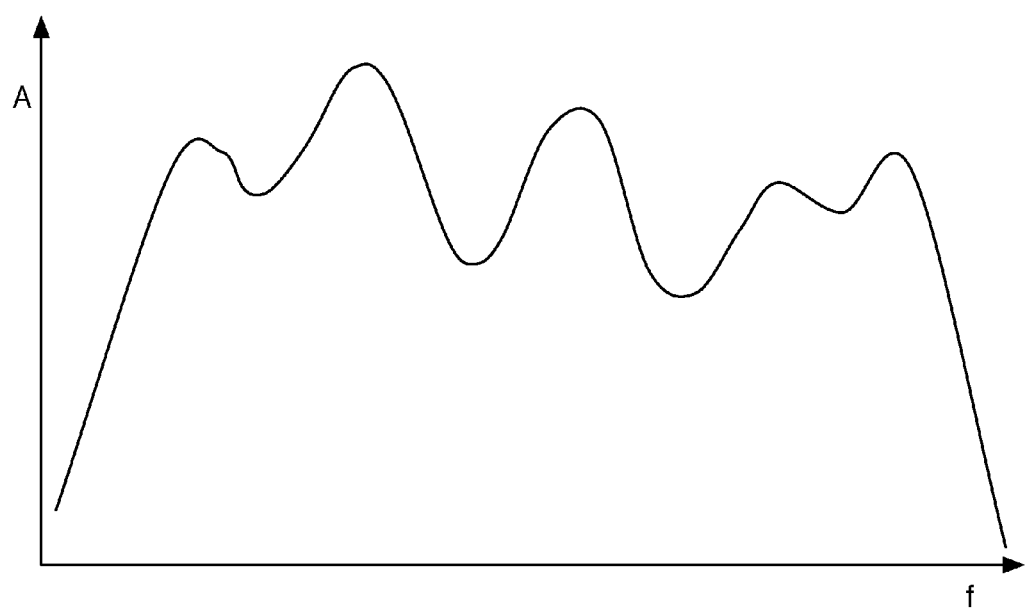
FIG. 8 is an example view of a desired self-interference canceller frequency response.
Figure 9A:
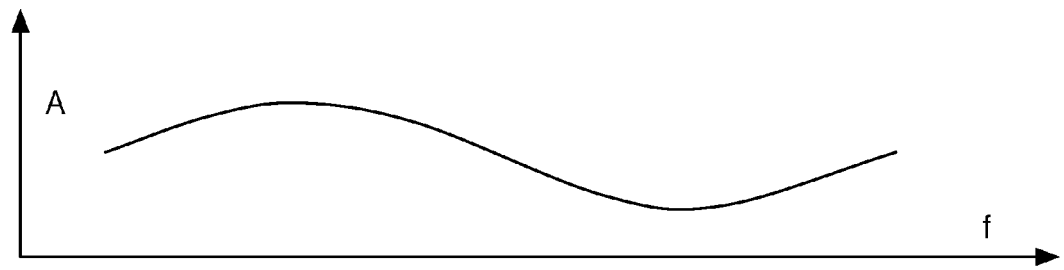
FIGS. 9A, 9B, and 9C are example views of frequency responses of a set of basis filters of a system of a preferred embodiment.
Figure 9B:
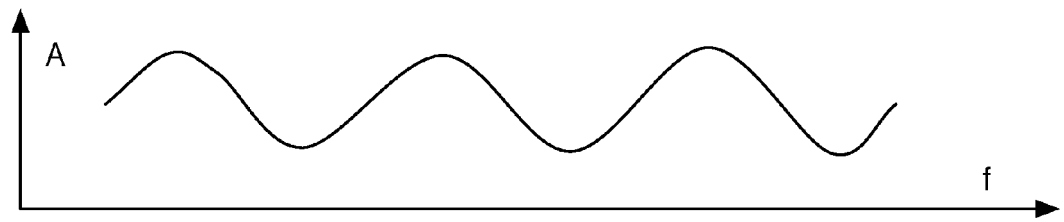
Figure 9C:
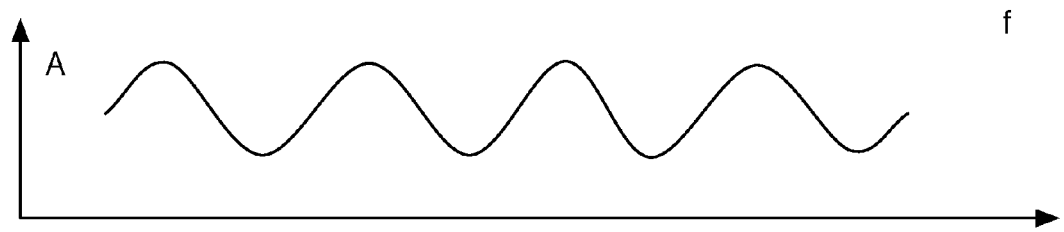

For example, take a desired filter response as shown in FIG. 8. If the tunable filters 142 are limited to only a few types of simple bandpass filters, it may take a great number of filters to reproduce the filter response of FIG. 8. By using filters specifically designed to form a basis set for a particular transformation, a much smaller number of filters may be used. For example, the response of FIG. 8 may be reproduced using a linear combination of only three filters as shown in FIGS. 9A, 9B, and 9C.

The scalers 143 function to scale transmit signal components; specifically, the scalers 143 effectively multiply the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of $$e^{\frac{i\pi}{2}}$$

might be represented as a phase shift of ninety degrees. The scalers 143 provide the weighting for the combination of self-interference components at the signal combiner 145 (e.g., a signal with scale factor 2 is weighted twice as heavily as one with a scale factor of 1).

The scalers 143 may include attenuators, amplifiers, phase inverters, and/or any other suitable components for scaling transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers 143 preferably are capable of attenuation, gain, and phase inversion, but may alternatively be capable only of a subset of said capabilities. Each scaler 143 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit). The scalers 143 are preferably controlled by the tuning circuit 160, but may additionally or alternatively be controlled in any suitable manner. The tuning circuit 160 preferably controls scalers 143 by dynamically setting scale factors for each scaler 143, but may additionally or alternatively control scalers 143 in any suitable manner.

The delayers 144 function to delay transmit signal components, preferably to match corresponding delays in received self-interference. The delay introduced by each delayer 144 (also referred to as a delayer delay) is preferably fixed (i.e., the delayer 144 is a fixed delayer), but delayers 144 may additionally or alternatively introduce variable delays. The delayer 144 is preferably implemented as an analog delay circuit (e.g., a bucket-brigade device, a long transmission line, a series of RC networks) but may additionally or alternatively be implemented in any other suitable manner. If the delayer 144 is a variable delayer, the delay introduced is preferably set by the tuning circuit 160, but may additionally or alternatively be set in any suitable manner.

After transformation by a scaler 143 and/or a delayer 144, transmit signal components are transformed into self-interference cancellation signal components, which may be combined to form an self-interference cancellation signal.

The signal combiner 145 functions to combine the self-interference cancellation signal components into an analog self-interference cancellation signal; the analog self-interference cancellation signal may then be combined with an analog receive signal to remove self-interference. The signal combiner 145 preferably combines self-interference cancellation signal components (resulting from multiple signal paths) and outputs the resulting analog self-interference cancellation signal. The signal combiner 145 is preferably a transmission line coupler, but may additionally or alternatively be any suitable type of coupler (described in the signal coupler 130 sections). The signal combiner 145 may additionally contain any suitable electronics for post-processing the self-interference cancellation signal before outputting it; for example, the signal combiner 145 may contain an amplifier to increase the power of the self-interference cancellation signal.

Figure 10:
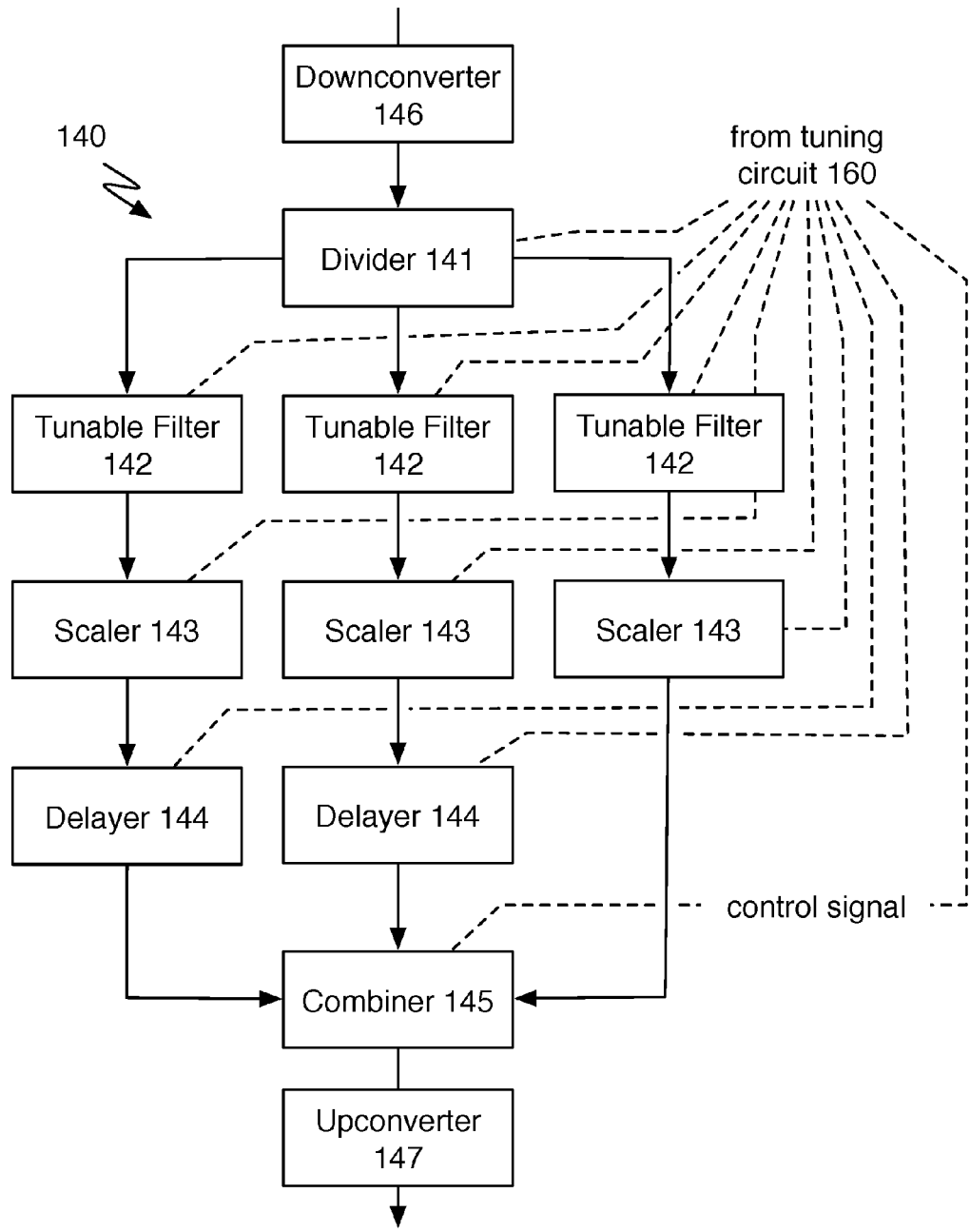
FIG. 10 is a schematic representation of a system of a preferred embodiment.
Figure 11:
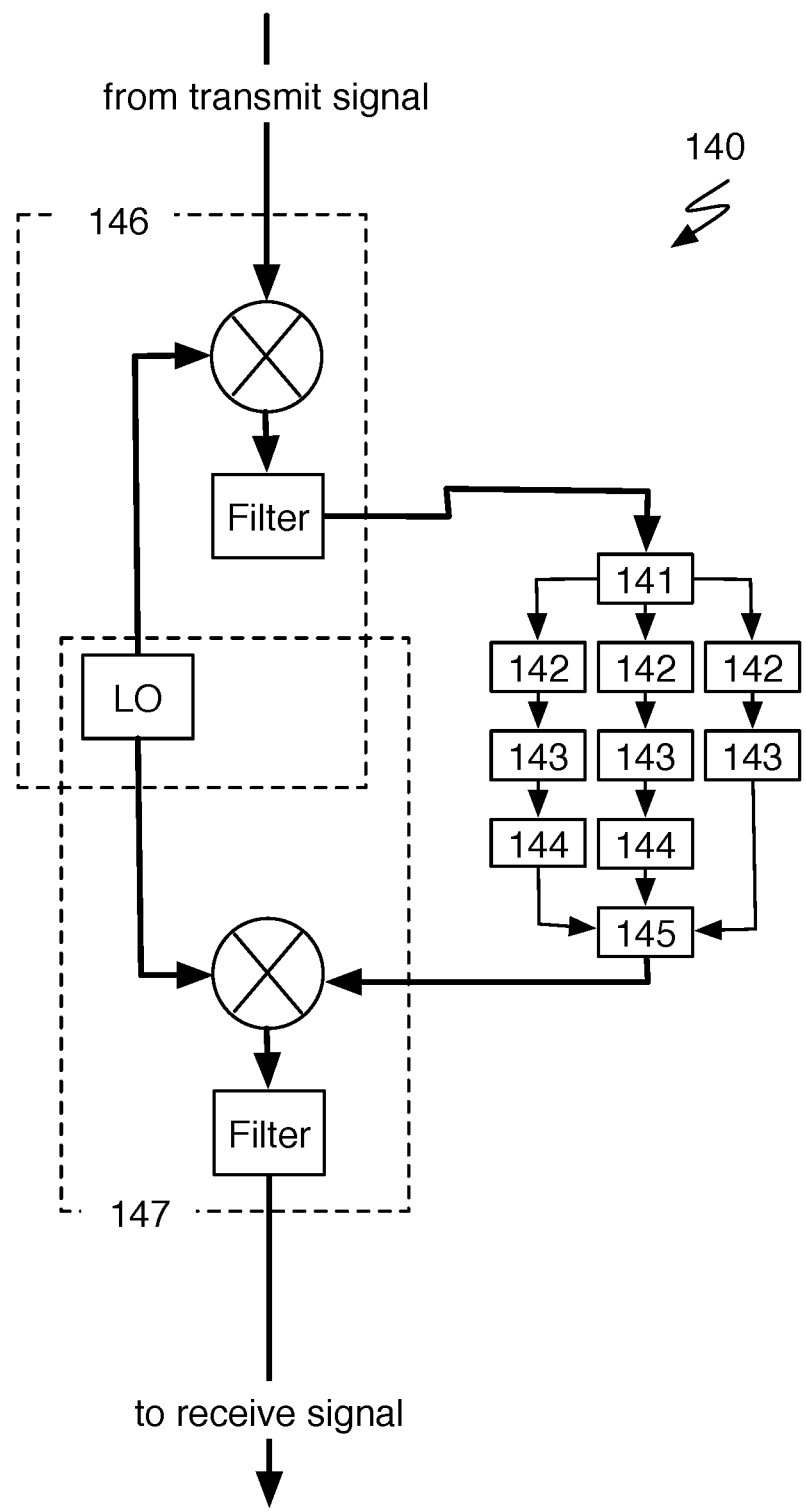
FIG. 11 is a schematic representation of a system of a preferred embodiment.

As previously mentioned, the analog self-interference canceller 140 may perform self-interference cancellation at either or both of IF or RF bands. If the analog self-interference canceller 140 performs cancellation at IF bands, the analog self-interference canceller 140 preferably includes a downconverter 146 and an upconverter 147, as shown in FIGS. 10 and 11.

The downconverter 146 functions to downconvert the carrier frequency of an RF transmit signal (the analog transmit signal sampled by a signal coupler 130) to an intermediate frequency (or, in some cases, baseband (IF=0 Hz)) preparing it for transformation by the analog canceller 140. The downcoverter 146 is preferably communicatively coupled to the RF transmit signal by a signal coupler 130, and the analog canceller 140, and preferably receives RF transmit signals from the signal coupler 130, downconverts the signal to an intermediate frequency, and passes the resulting IF transmit signal to the analog canceller 140. The downconverter 146 is preferably substantially similar to the downconverter 112 (although details such as LO frequency and filter configuration may differ between the two), but may additionally or alternatively be any suitable frequency downconverter.

The upconverter 147 functions to upconvert the carrier frequency of the IF self-interference signal (received from the analog canceller 140) to a radio frequency, preparing it for combination with the RF receive signal at a signal coupler 130. The upconverter 147 is preferably communicatively coupled to the signal coupler 130 and the analog canceller 140, and preferably receives IF self-interference cancellation signals from the analog canceller 140, upconverts the signal to a radio frequency, and passes the resulting RF self-interference cancellation signal to the signal coupler 130.

Figure 12:
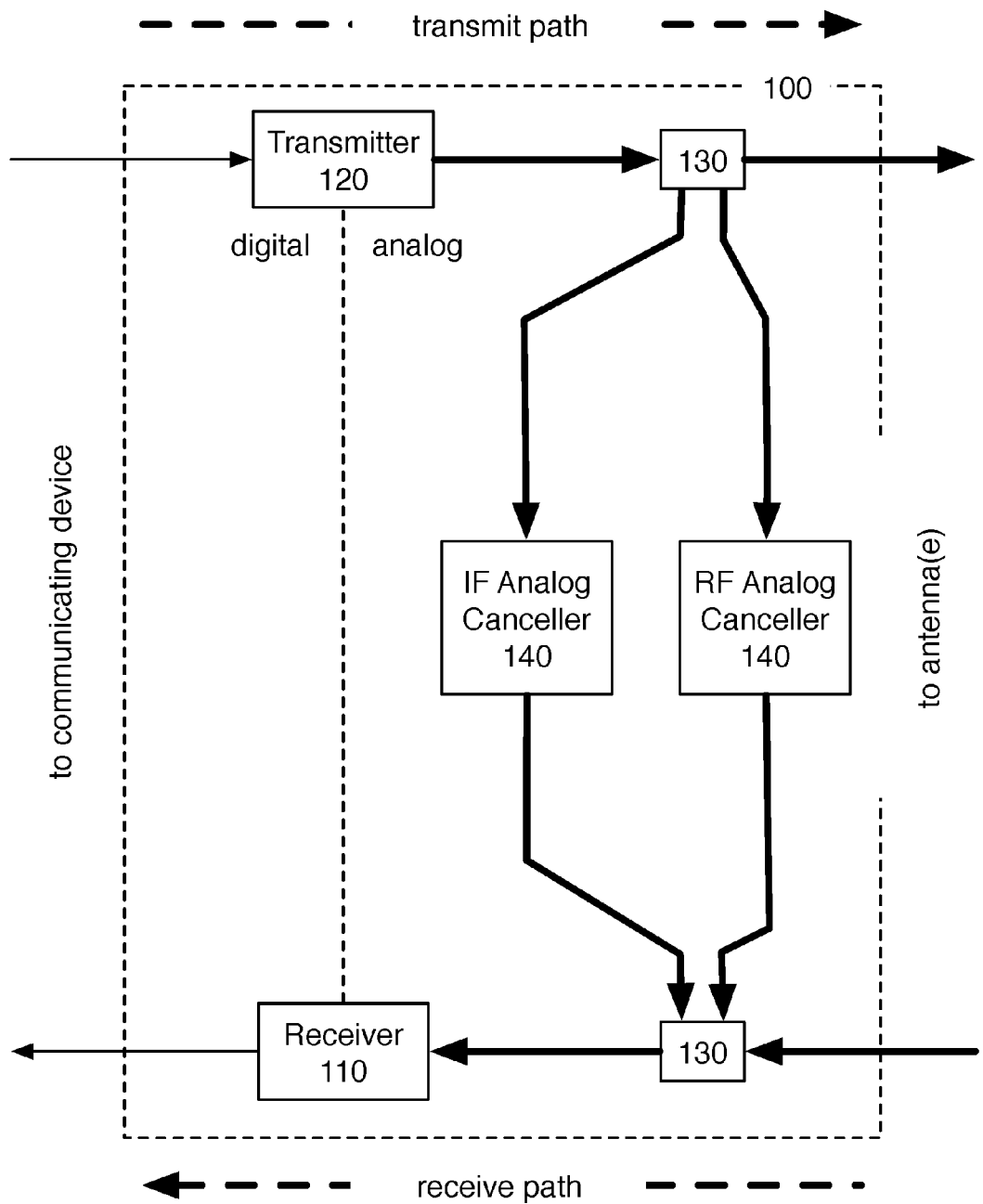
FIG. 12 is a schematic representation of a system of a preferred embodiment.

In a variation of a preferred embodiment, the system 100 may include multiple analog self-interference cancellers operating in different frequency bands, as shown in FIG. 12.

The digital self-interference canceller 150 functions to produce a digital self-interference cancellation signal from a digital transmit signal. The digital self-interference cancellation signal is preferably converted to an analog self-interference cancellation signal (by a DAC) and combined with the analog self-interference cancellation signals to further reduce self-interference present in the RF receive signal at the receiver 110. Additionally or alternatively, the digital self-interference cancellation signal may be combined with a digital receive signal.

The digital self-interference canceller 150 preferably samples the RF transmit signal of the transmitter 120 using an ADC (additionally or alternatively, the canceller 150 may sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 150 transforms the digital transmit signal to a digital self-interference signal (e.g. coefficients of a generalized memory polynomial used to transform the transmit signal to a self-interference signal).

The digital self-interference canceller 150 may be implemented using a general-purpose processor, a digital signal processor, an application specific integrated circuit (ASIC), a field programmable gate array (FPGA) and/or any suitable processor(s) or circuit(s). The digital self-interference canceller 150 preferably includes memory to store configuration data, but may additionally or alternatively be configured using externally stored configuration data or in any suitable manner. In one implementation, the digital self-interference canceller 150 is substantially similar to the digital self-interference canceller of U.S. patent application Ser. No. 14/456,320, filed 11 Aug. 2014, which is incorporated in its entirety by this reference.

The digital self-interference canceller 150 may couple to transmit and receive signals in a number of ways. For example, the digital self-interference canceller 150 may use a converted RF transmit signal as input as well as provide a converted digital self-interference cancellation signal as output. As another example, the digital self-interference canceller 150 may use the digital transmit signal as input as a well as provide a digital self-interference cancellation signal as output (directly to the digital receive signal). The digital self-interference canceller may additionally or alternatively couple to transmit signals in any combination of digital and analog receive signals.

Note that while these examples reference the RF transmit signal and RF receive signal, the digital self-interference canceller 150 may additionally or alternatively couple to IF transmit signals and/or IF self-interference cancellation signals.

The tuning circuit 160 functions to control the configuration parameters of the analog canceller 140. The tuning circuit 160 may additionally or alternatively provide input to or control configuration parameters of the digital canceller 150. Configuration parameters may include pre-processing settings (at signal dividers 141), filter center frequency and/or Q factor (at tunable filters 142), scale factor (at the scalers 143), delay (at the delayers 144), post-processing settings (at the signal combiner 145) and/or any other suitable configuration parameters. The tuning circuit 160 preferably controls tunable filter 142 center frequencies, scaler 143 scale factors (including gain/attenuation/phase inversion), and delayer 144 delays to create RF and/or IF self-interference cancellation signals that reflect some or all of the self-interference contained within received signals.

The tuning circuit 160 preferably sets the configuration state of the analog canceller 140 (where the state includes settings for each variable setting controlled by the tuning circuit 160) based upon the received RF/IF transmit signals, but may additionally or alternatively set the configuration state based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

The tuning circuit 160 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the tuning circuit 160 may set configuration states in any suitable manner.

The tuning circuit 160 may adapt configuration states and/or configuration state generating/choosing algorithms using analytical methods, online gradient-descent methods (e.g., LMS, RLMS), and/or any other suitable methods. The tuning circuit 160 may additionally or alternatively adapt configuration states and/or configuration state generating/choosing algorithms based on test input scenarios (e.g. scenarios when the signal received by the receiver 110 is known), scenarios where there is no input (e.g. the only signal received at the receiver 110 is the signal transmitted by the transmitter 120), or scenarios where the received signal is unknown. In cases where the received signal is an unknown signal, the tuning circuit 160 may perform adaptation based on historical received data (e.g. what the signal looked like ten seconds in the past) or any other suitable information. The tuning circuit 160 may additionally or alternatively perform adaptation based on the content of RF and/or IF transmit signals; for instance, if the RF transmit signal is modulated in a particular way, the tuning circuit may perform adaptation such that when the RF self-interference signal is combined with the RF receive signal the detected modulation (as an indicator of self-interference) is reduced.

The tuning circuit 160 is preferably implemented as a programmable digital circuit, but may additionally or alternatively be implemented in any suitable digital or analog circuit, including implementation as software in a general purpose computing device.

Though the cancellers 140/150 are preferably coupled to signal couplers 130 located after transmitter 120 outputs and before receiver 110 inputs, the cancellers 140/150 may additionally or alternatively be coupled to intermediate outputs and/or inputs (e.g., an output before the transmitter 120 output or an input after the receiver 110 input).

Local oscillators (e.g., those of upconverters, downconverters, ADCs, and/or DACs) may be shared between components of the system 100. For example, the downconverter 146 and upconverter 147 may share a local oscillator as shown in FIG. 11. This can serve to reduce phase noise errors. Local oscillators may be shared between any components of the system 100.

3. Method for Self-Interference Canceller Tuning

Figure 13:
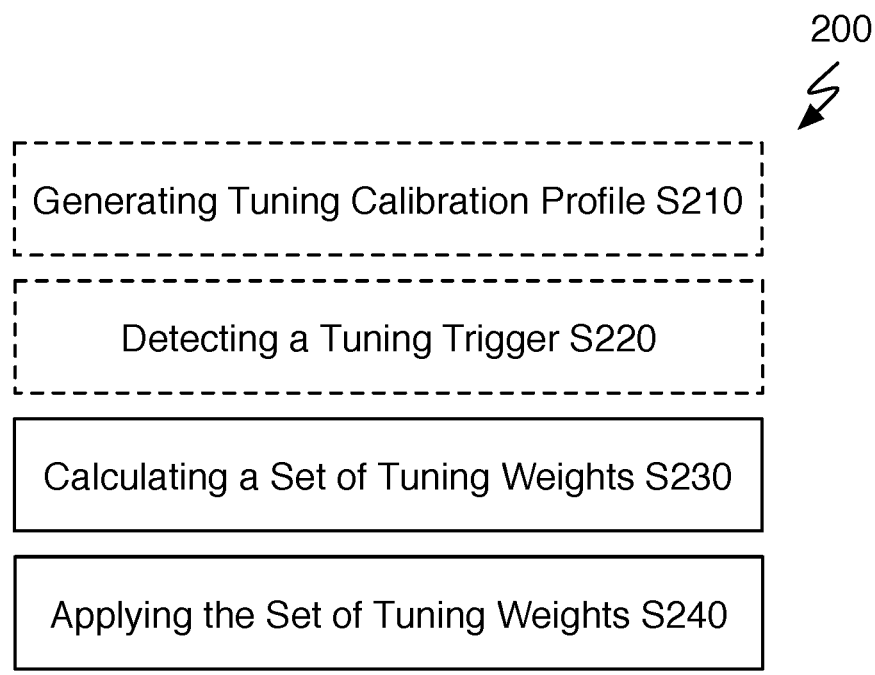
FIG. 13 is a chart representation of a method of a preferred embodiment.

As shown in FIG. 13, a method 200 for self-interference canceller tuning includes calculating a set of tuning parameters S230, and applying the set of tuning parameters S240. The method 200 may additionally include generating a tuning calibration profile S210 and/or detecting a tuning trigger S220.

The method 200 functions to increase the performance of full-duplex transceivers (or other applicable systems) by enabling efficient self-interference canceller tuning. The method 200 is preferably implemented by the system 100, but may additionally or alternatively be implemented by any suitable system for self-interference cancellation.

Step S210 includes generating a tuning calibration profile. Step S210 functions to generate a profile that describes the response of the self-interference canceller to various tuning parameters.

The tuning calibration profile generated by Step S210 preferably describes the response of the self-interference canceller given various tuning parameters across a range of tuning parameters. The tuning calibration profile preferably includes both component calibration data and system calibration data, but may additionally or alternatively include only one of these.

Component calibration data preferably describes the relationship between a particular setting for a component of the self-interference canceller (e.g., a scaler or a delayer) and how that component transforms a signal. For example, component calibration data may include data describing how a tunable filter's center frequency varies with different capacitance values (for some tuning capacitor present in the tunable filter) or data describing how different control voltages for an attenuator affect attenuation levels. In addition to describing how a particular setting affects component response, component calibration data may also describe how other variables (e.g., temperature, signal power, signal frequency, etc.) affect component response.

In some cases, component calibration data may be a function of both settings and other variables. For instance, the previously described tunable filter data may vary based on temperature as well as tuning capacitor settings.

Component calibration data is preferably generated by sweeping individual components through settings (and/or by altering other variables, such as environmental variables) and recording their responses, but component calibration data may additionally or alternatively be generated using any other suitable process.

System calibration data preferably describes how the self-interference canceller responds to signals based on a particular state (i.e., a set of tuning parameters applied to the components). For example, system calibration data may describe how a three-tap (i.e., three-signal-path) self-interference canceller responds to an input signal based on the component settings (e.g., the value of tuning capacitance for each tunable filter, attenuator control voltages, etc.).

As with component calibration data, system calibration data may depend both on system settings as well as other variables (e.g., temperature).

System calibration data and component calibration data are preferably integrated such that a desired signal transformation may be, using the tuning calibration profile, translated into a set of self-interference canceller settings, which can then be applied.

Figure 14:
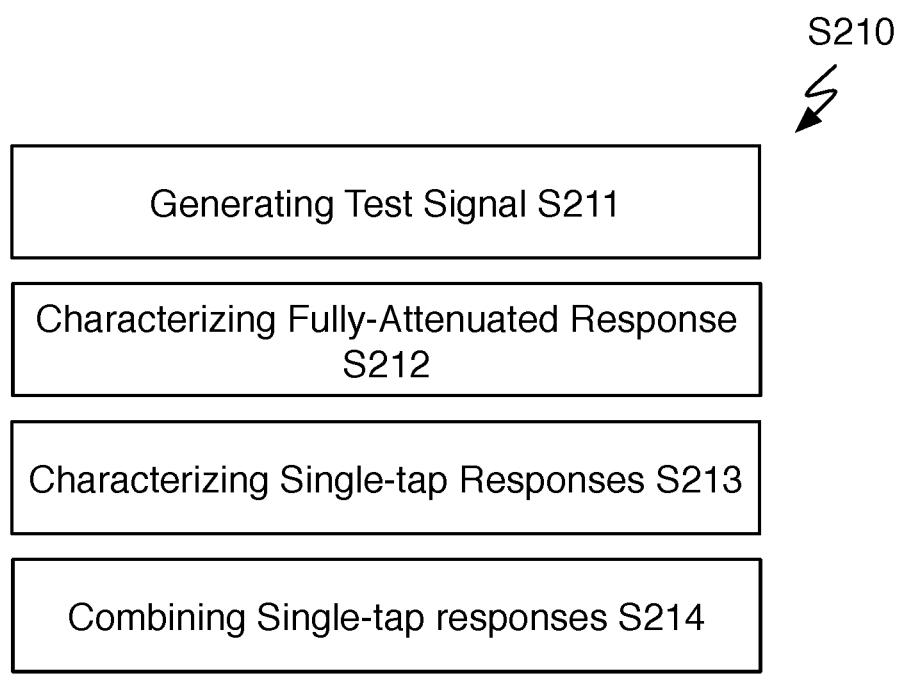
FIG. 14 is a chart representation of a calibration generation of a method of a preferred embodiment.

In one embodiment, generating a tuning calibration profile S210 for a self-interference canceller having a set of taps includes generating a test signal S211, characterizing fully-attenuated response to the test signal S212, characterizing single tap responses to the test signal S213, and combining single tap responses S214, as shown in FIG. 14.

Generating a test signal S211 functions to provide a signal to characterize self-interference canceller response. The test signal is preferably an Orthogonal Frequency Division Multiplexing (OFDM) frame or chirp signal with a low peak to average ratio, but may additionally or alternatively be any suitable signal. The test signal is preferably generated by an RF transmitter coupled to the self-interference canceller, but may additionally or alternatively be generated by any suitable source.

Characterizing fully-attenuated response to the test signal S212 functions to characterize the response of a multi-tap self-interference canceller when all taps of the multi-tap self-interference canceller (i.e., all signal paths) are highly attenuated. The fully-attenuated response to the test signal is preferably used as a baseline for evaluating single tap responses.

Characterizing single tap responses to the test signal S213 functions to determine the response of each tap individually to the test signal. Step S213 preferably includes highly attenuating all taps except for one tap (the tap being characterized). The characterized tap is preferably swept through a range of parameters (e.g., attenuator settings, phase change settings, tunable filter center frequencies, etc.) and the response of the tap is recorded for each step of the parameter sweep. The characterized tap may additionally or alternatively be characterized for other variables (e.g., temperature). Some tap characterization data may be synthesized or inferred from external data sources (e.g., manufacturer component data relating output voltage of an attenuator to control voltages). Step S213 is preferably performed for each tap.

Step S213 preferably includes characterizing each tap relative to the baseline established in Step S212.

In a variation of a preferred embodiment, Step S213 is performed for multiple tap combinations; for example, the response of a first tap and second tap may be measured at the same time (i.e., the first and second tap are not at high attenuation, while other taps are).

Combining single tap responses S214 functions to combine the response of each tap in order to create a tuning calibration profile that reflects the performance of the self-interference canceller. Step S214 preferably includes simply concatenating single tap data; additionally or alternatively, Step S214 may be modified to reflect system-level effects not captured by measuring each tap individually. For example, Step S214 may include effects of a system-level delayer (e.g., a delayer located before the signal splitter for the taps or after the signal combiner) or may simply account for interactions between taps.

Step S220 includes detecting a tuning trigger. Step S220 functions to detect a trigger or other indicator that the self-interference canceller should be tuned. Step S220 preferably includes detecting that some value has passed a threshold; for example, time since last tuning exceeding a particular time threshold, signal power level changing by some threshold percentage, or a significant change in temperature. Step S220 may additionally or alternatively include detecting a recent system boot-up (enabling tuning to be performed upon boot-up).

Step S220 preferably includes detecting a trigger to retune the self-interference canceller, but may additionally or alternatively include detecting a trigger to perform recalibration (i.e., generating a new calibration tuning profile using Step S210).

Step S230 includes calculating a set of tuning parameters. Step S230 functions to create the set of tuning parameters that will be applied to the self-interference canceller in order to tune the canceller.

Step S230 is preferably performed iteratively with Step S240; for example, a set of tuning parameters estimated to reduce self-interference may be calculated by Step S230, applied by Step S240, and based on the change in self-interference (i.e., the effectiveness of the self-interference canceller) a new set of tuning parameters may be calculated by Step S230. Additionally or alternatively, Step S230 may be performed once per calibration.

Tuning parameters calculated in Step S230 may include pre-processing settings (at signal dividers), filter center frequency and/or Q factor (at tunable filters), scale factor (at the scalers), delay (at the delayers), post-processing settings (at the signal combiner) and/or any other suitable configuration parameters. Tuning parameters are preferably chosen based on self-interference detected in received RF/IF signals, but may additionally or alternatively be chosen based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

In one embodiment, tuning parameters comprise a set of complex weights (e.g., a scaling factor and/or a phase change factor) and a set of delays. These tuning parameters can, in combination with component calibration data, be translated into self-interference canceller settings.

Step S240 includes applying the set of tuning parameters. Step S240 functions to apply the tuning parameters calculated in Step S230 to tune the self-interference canceller. A tuning circuit is preferably used to control tunable filter center frequencies, scaler scale factors (including gain/attenuation/phase inversion), and delayer delays to create RF and/or IF self-interference cancellation signals that reflect some or all of the self-interference contained within received signals.

In one embodiment, Step S240 includes applying tuning parameters based on component calibration data as described above. For example, a set of complex weights may be generated by Step S230 and then applied in Step S140 after translating the complex weights into component settings using component calibration data.

In one embodiment, the method 200 is implemented on a self-interference canceller using an orthogonal basis set of multi-peak filters (such as that of FIGS. 9A, 9B, and 9C). In this embodiment, configuration parameters are preferably generated using online gradient-descent methods (e.g., LMS, RLMS), but configuration parameters may additionally or alternatively be generated using any suitable algorithm.

In a variation of this embodiment, configuration parameters are generated by first tuning delay parameters and then tuning tap complex weights by solving a linear optimization problem (e.g., a Lasso problem):

$$\min \|y - Aw\|_2^2 + \lambda |w|_1, w_{min} > w > w_{max}$$

where y represents an observed signal (e.g., the self-interference signal to be cancelled), A represents the response of the circuit given different parameters, w reflects a set of complex weights (or other parameters), and $w_{min}$ and $w_{max}$ represent minimum and maximum possible parameter values.

For certain embodiments, an optimization technique such as the Alternating Direction Method of Multipliers (ADMM) may be used to determine parameters of the circuit. In the ADMM technique, the optimization problem is split in to two or more partial problems. Each of the partial problems may be easier to solve. Solutions to the partial problems are cross-fed into other partial problems to find a solution to the original optimization problem. The process may continue iteratively to find a final solution. As an example, the previous problem can be stated as:

$$\min \|y - Aw\|_2^2 + \lambda |z|_1, w - z = 0, z_{min} > z > z_{max}$$

The above problem can be independently solved for each of the w and z parameters to find two solutions. The two solutions may then be connected with each other using a difference variable. The difference value may then be minimized to solve the original optimization problem.

It should be noted that one important criterion decides when to terminate the iterative optimization problem to limit the computations, with minimal performance loss. In one embodiment, the iterative problem is terminated, whenever a point is reached that is better than the discrete setting of a tap. As an example, if the weights can take discrete values such as 0.25, 0.5, 0.75, etc. the iterative problem may be terminated as soon as another solution is found with a resolution better than 0.25. Terminating the optimization problem based on the predefined resolution speeds up the tuning procedure.

The method 200 is preferably used to tune an analog self-interference canceller, but the principles described may additionally or alternatively be used to tune a digital self-interference canceller.

In a variation of a preferred embodiment, Step S240 includes applying tuning parameters for an analog self-interference canceller based on response of a digital self-interference canceller. For example, Steps S230 and S240 may include ignoring a self-interference signal component (e.g., calculating tuning parameters ignoring the contribution of this component to self-interference) if that component is recognized as a self-interference component easily removed by a digital self-interference canceller. As another example, Steps S230 and Step S240 may be run iteratively in combination with a digital self-interference canceller tuning algorithm.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for self-interference canceller tuning comprising:
 a transmit coupler, communicatively coupled to an analog transmit signal of a wireless communication system, that samples the analog transmit signal to create a sampled analog transmit signal;

an analog self-interference canceller that transforms the sampled analog transmit signal to an analog self-interference cancellation signal according to a set of tuning parameters, the set of tuning parameters comprising complex weights for a set of taps of the analog self-interference canceller; wherein each tap of the set of taps is associated with a filter;

a tuning circuit that generates a tuning calibration profile based on both component calibration data and system calibration data of the analog self-interference canceller, calculates the set of tuning parameters in response to detection of a tuning trigger, and applies the set of tuning parameters to the analog self-interference canceller based on the tuning calibration profile; wherein the tuning trigger is detected in response to either time since last tune exceeding a time threshold or temperature change over a time interval exceeding a temperature change threshold; wherein applying the set of tuning parameters comprises setting attenuator values for each tap of the set of taps; and a receive coupler, communicatively coupled to an analog receive signal of the wireless communication system, that combines the analog self-interference cancellation signal with the analog receive signal to reduce self-interference in the analog receive signal.

2. The system of claim 1, wherein the tuning circuit generates a tuning calibration profile by:
generating a test signal;
characterizing a fully-attenuated response of the analog self-interference canceller to the test signal;
characterizing a set of single tap responses of the analog self-interference canceller to the test signal; and
combining the set of single tap responses.

3. The system of claim 1, wherein the tuning circuit sets delayer values for each tap of the set of taps when applying the set of tuning parameters.

4. The system of claim 1, wherein the tuning circuit translates the set of tuning parameters using component calibration data of the tuning calibration profile when applying the set of tuning parameters.

5. The system of claim 1, wherein the set of tuning parameters comprises tunable filter center frequencies.

6. A system for self-interference canceller tuning comprising:
a transmit coupler, communicatively coupled to an analog transmit signal of a wireless communication system, that samples the analog transmit signal to create a sampled analog transmit signal;
an analog self-interference canceller that transforms the sampled analog transmit signal to an analog self-interference cancellation signal according to a set of tuning parameters, the set of tuning parameters comprising complex weights for a set of taps of the analog self-interference canceller; wherein each tap of the set of taps is associated with a filter of a set of basis filters; wherein a majority of the set of basis filters are multi-peak filters;
a tuning circuit that generates a tuning calibration profile based on component calibration data of the analog self-interference canceller, calculates the set of tuning parameters in response to detection of a tuning trigger, and applies the set of tuning parameters to the analog self-interference canceller based on the tuning calibration profile; wherein applying the set of tuning parameters comprises setting attenuator values for each tap of the set of taps; and a receive coupler, communicatively coupled to an analog receive signal of the wireless communication system, that combines the analog self-interference cancellation signal with the analog receive signal to reduce self-interference in the analog receive signal.

7. The system of claim 6, wherein the tuning circuit sets delayer values for each tap of the set of taps when applying the set of tuning parameters.

8. The system of claim 6, wherein the tuning circuit calculates the set of tuning parameters in response to a change in parameters of a digital self-interference canceller.

9. The system of claim 6, wherein the tuning circuit ignores contribution of a self-interference component when calculating the set of tuning parameters.

10. The system of claim 6, wherein the tuning circuit calculates the set of tuning parameters iteratively in combination with a digital self-interference canceller tuning algorithm.

11. The system of claim 6, wherein the tuning circuit detects the tuning trigger by detecting boot-up of the analog self-interference canceller.

12. The system of claim 6, wherein the filters of the set of basis filters are substantially orthogonal.

13. A method for self-interference canceller tuning comprising:
generating a tuning calibration profile based on component calibration data of an analog self-interference canceller; wherein the analog self-interference canceller generates a self-interference cancellation signal that is combined with a first receive signal to create a reduced-self-interference receive signal;
detecting a tuning trigger in response to a second receive signal exceeding a power threshold;
calculating a set of tuning parameters in response to the tuning trigger; wherein the set of tuning parameters comprises complex weights for a set of taps of the analog self-interference canceller; wherein each tap of the set of taps is associated with a filter; and
applying the set of tuning parameters based on the tuning calibration profile; wherein applying the set of tuning parameters comprises setting attenuator values for each tap of the set of taps.

14. The method of claim 13, wherein the second receive signal is the first receive signal.

15. The method of claim 13, wherein the second receive signal is the reduced-self-interference receive signal.

16. The method of claim 15, wherein detecting the tuning trigger comprises detecting the tuning trigger in response to the second receive signal exceeding the power threshold for a time greater than a threshold time.

17. The method of claim 13, wherein generating a tuning calibration profile comprises:
generating a test signal;
characterizing a fully-attenuated response of the analog self-interference canceller to the test signal;
characterizing a set of single tap responses of the analog self-interference canceller to the test signal; and
combining the set of single tap responses.

18. The method of claim 13, wherein generating the tuning calibration profile comprises generating the tuning calibration profile in response to detection of the tuning trigger.

19. The method of claim 13, wherein applying the set of tuning parameters based on the tuning calibration profile comprises translating the set of tuning parameters using component calibration data of the tuning calibration profile.

20. The method of claim 19, wherein the set of tuning parameters comprises tunable filter center frequencies.

* * * * *